US005930331A

United States Patent [19]

Rentzepis et al.

[11] Patent Number: 5,930,331

[45] Date of Patent: Jul. 27, 1999

[54] COMPACT HIGH-INTENSITY PULSED X-RAY SOURCE, PARTICULARLY FOR LITHOGRAPHY

[76] Inventors: Peter M. Rentzepis, University of California, Irvine Dept. of Chemistry, 579 Physical Sciences; John Peter Rentzepis, 28 Los Trancos, both of Irvine, Calif. 92717

[21] Appl. No.: 07/748,744

[22] Filed: Aug. 20, 1991

Related U.S. Application Data

[63] Continuation-in-part of application No. 07/326,910, Mar. 22, 1989, Pat. No. 5,024,058.

[51] Int. Cl.[6] .......... H01S 35/06

[52] U.S. Cl. .......... 378/136; 378/119

[58] Field of Search .......... 378/119, 121, 378/122, 136

[56] References Cited

U.S. PATENT DOCUMENTS

| | | | |
|---|---|---|---|
| 4,606,061 | 8/1986 | Ramamurti | 378/136 |
| 4,723,263 | 2/1988 | Birnbach et al. | 378/136 |
| 4,724,536 | 2/1988 | Oba | 378/119 |

*Primary Examiner*—Craig E Church
*Attorney, Agent, or Firm*—Fuess & Davidenas

[57] ABSTRACT

A photoemissive photocathode, being a metal with a low work function and preferably tantalum-surfaced cesium-antimonide, is illuminated with pulses of 5320 Å laser light, typically 20 psec at a 20 Hz repetition rate, to emit electrons by the photoelectric effect. The emitted electrons are accumulated in a spatial region near the photocathode by a grid electrode. The same laser pulses activate a semiconductor switch, normally an $LiTaO_3$ crystal doped with 2.24% Cu, to apply a high voltage, typically 100 Kv, between the photocathode and an anode. The accumulated electrons are accelerated, and focused, as an electron beam that strikes the anode, typically in a focal spot of less than 0.5 mm diameter. Time-resolved x-ray pulses, typically K band of 20 picoseconds duration with 4–10 microjoules energy each, are produced. A laser-induced pulsed wide-area table-top-size embodiment of the x-ray source reliably generates a 1–10 $mW/cm^2$ flux of hard, 0.1–1 nm, x-rays from picosecond duration laser pulses, and a 20–40 $mW/cm^2$ flux of x-rays from 20 ns, 193 nm laser pulses at a pulse repetition rate of 300 Hz minimum, 1,000 Hz typical. The x-ray generation is uniform over a large 20 $cm^2$ anode area. A mask is placed in direct contact with the anode for lithography.

28 Claims, 2 Drawing Sheets

COMPACT HIGH-INTENSITY PULSED X-RAY SOURCE, PARTICULARLY FOR LITHOGRAPHY

REFERENCE TO RELATED APPLICATIONS

The present patent application is a continuation-in-part of copending U.S. patent application Ser. No. 07/326,910 filed Mar. 22, 1989 for an ULTRASHORT TIME-RESOLVED X-RAY SOURCE, now issued as U.S. Pat. No. 5,024,058 on Aug. 20, 1991. The inventor of the copending patent application is the selfsame Peter M. Rentzepis who is one of the co-inventors of the present application.

BACKGROUND OF THE INVENTION

1. Field of the Invention

The present invention concerns the generation of x-rays, and particularly time-resolved x-rays having nanosecond and shorter duration. The present invention particularly concerns x-ray sources for lithography, and especially sources providing an energetic flux of hard x-ray radiation over a spatially extended area.

2. Background of the Invention

The present invention generally relates to the production of x-ray radiation, particularly time-resolved pulses of x-ray radiation, and particularly relates to the production of x-ray radiation over a spatially extended area.

2.1 Time-Resolved X-ray Sources

The earliest attempts to produce time-resolved x-rays employed mechanical shutters that moved in front of x-ray sources. For example, transmission of x-rays through x-ray transparent apertures within a rotating apertured disk that was otherwise opaque to x-rays permitted the generation of millisecond x-ray pulses. These millisecond x-ray pulses were too slow to permit the study by x-ray diffraction of any type of molecular phenomena such as reaction, melding, dissociation, or vibration. Millisecond x-ray pulses were, however, sometimes sufficient to permit observation of certain biological phenomena, although not normally at the biomolecular level.

Davanloo et al., *Rev. Sci. Instrum.* 58:2103–2109 (1987) reported constructing an x-ray source capable of producing x-ray pulses of nanosecond (ns) duration. That x-ray source utilized (i) a low impedance x-ray tube, (ii) a Blumlein power source, and (iii) a commutation system for periodically applying power from the Blumlein power source to the x-ray tube. The system yielded 140-mW average power in 15 ns pulses of radiation near 1 Å. That device, and others based on Blumlein-generators, suffers from (i) low repetition rates in the range of 100 hertz, (ii) prospective inability to produce pulses shorter than about 15 nsec, and (iii) low energy efficiency on the order of 25%. The durability in operational use of Blumlein-based sources of x-ray flashes is also uncertain.

More recently, *Science News*, Vol. 134, No. 2: pp. 20 (1989) reported that scientists at Cornell University and the Argonne National Laboratory have developed a device, called an undulator, capable of producing x-ray pulses one-tenth of a billionth of a second (100 picoseconds) in duration. The undulator utilized synchrotron radiation from fast-moving charged particles in an electron storage ring. Because electron storage rings are typically large and expensive, the ring used at Cornell being one half-mile in diameter, the production of bright x-ray flashes by such means is distinctly not adaptable to the scale and budget of a typical materials or biological laboratory.

X-rays have been produced using plasma sources that are energized by lasers. In laser plasma x-ray sources, either a pulsed-infrared (IR) laser or a ultraviolet (UV) excimer laser is used with pulse widths varying from less than 10 picoseconds to 10 nanoseconds. The laser beam is focused on a target where it creates a plasma having a sufficiently high temperature to produce continuous and characteristic x-ray radiation. Major disadvantages of laser plasma x-ray sources include (i) a diffuse, non-point, area of x-ray emission (ii) low efficiency and (iii) low repitition rate.

2.2 X-ray Sources for Lithography

Since the seminal paper by Henry Smith appeared in 1972, the achievement of economical x-ray lithography has been rather elusive. During the intervening years, however, considerable progress in many areas has been made, including development of masks, resists and registration capabilities.

Three main classes of x-ray sources are considered as a possible choice for lithography. Those are electron impact tubes, laser-based plasmas, and synchrotrons. Progress has been made in each of these sources, particularly in laser-driven plasma x-ray sources. Efforts in Japan have been devoted to the development of compact, high density synchrotrons. Even today, each of these sources has its limitations for a practical system.

The most intense sources are the synchrotrons, but so far their price, size and complexity make them prohibitive for use in a production line.

Electron impact tubes are the simplest and cheapest sources. However, their effectiveness is best only in the hard x-ray region. For high current output electron impact tubes must be pulsed because of the extreme heat generated on the anode by electron impact on the anode.

Laser driven x-ray sources have started to appear and show promise.

The requirements for a practical x-ray source for lithography are dependent on development of the other two critical components of the lithographic process—mask and resist. Most of the research and development for x-ray sources is centered in the 0.4–5 nm wavelength range where suitable resists are available. Use of still harder x-rays, 0.1–1.0 nm, would bring additional benefits, such as the possibility of ultrasensitive microsensors for medical and technological applications and, of course, higher resolution lithography permitting a denser layout of semiconductor components.

The present invention will be seen to be concerned with the generation of x-ray pulses for lithography in a manner that is believed to provide several distinct advantages over previous x-ray sources.

2.3 Photoemissive Sources of Electrons

By way of background to the present invention, Lee, et al., in *Rev. Sci. Instrum.*, 56:560–562 (1985) described a laser-activated photoemissive source of electrons. In the laser-activated photoemissive electron source a photocathode is illuminated with high intensity laser light as a means of generating numerous electrons by the photoelectric effect. The electrons emitted from the photocathode are focused in an electrical field, typically produced by electrodes in an electron-gun configuration, in order to produce a high intensity electron beam.

2.4 Rectification of Ultrashort Optical Pulses to Produce Electrical Pulses

By way of further background to the present invention, the rectification of ultrashort optical pulses in order to generate electrical pulses having durations and amplitudes that are unobtainable by conventional electronic techniques is described by Auston, et al. in the *Annl. Phys. Lett.*, 20: 398–399 (1972). Electrical pulses on the order of 4 amperes in 10 picoseconds are generated by rectification of 1.06 micrometer optical pulses in a $LiTaO_3$ crystal doped with approximately 2.24% Cu ($LiTaO_3$:$Cu^{++}$).

A doped transmission line, having an absorption coefficient of 60 $cm^{-1}$ and a thickness of 0.2 mm, is bonded with a thin epoxy layer to an undoped crystal in the form of a TEM electro-optic transmission line of 0.5×0.5-mm cross-sectional area. Current pulses are generated by absorption in this transducer of single 1.06 micrometer mode-locked Nd: glass laser pulses, typically of duration 3–15 psec and with an energy of approximately 1 mJ.

The electro-optic transmission line, or switch, operates to conduct current during the presence of laser excitation by action of the macroscopic polarization resulting from the difference in dipole moment between the ground and excited states of absorbing $Cu^{++}$ impurities. Effectively, the electric-optic transmission line, or switch, has a very great number of charge carriers, and is a very good conductor, during the presence of laser excitation. During other times it is a semiconductor and does not conduct appreciable current. The excited-state dipole effect of the transmission line, or switch, is exceptionally fast, on the order of 1 or 2 psec or less.

SUMMARY OF THE INVENTION

The present invention contemplates a compact, high-intensity, inexpensive, reliable, tunable, high-intensity pulsed x-ray (PXR) light source where copious electrons are efficiently produced at a photocathode by the photoelectric effect and then, having been efficiently produced, effectively accelerated and focused in a strong electric field to impinge upon a desired area of an anode, thereby to produce bright x-ray light by bremstrahlung.

In various embodiments an x-ray source in accordance with the present invention can produce pulsed x-ray radiation that is any one or ones of (i) very short (typically 20 ps), (ii) very bright (typically $6.2\times10^6$ $cm^{-2}$ $sr^{-1}$ at the Ka wavelength (1.54 Å), and/or (iii) very hard (typically 0.1–1 micrometer wavelength). X-ray source in accordance with the present invention are effectively applied in the areas of crystallography, spectrography, and especially lithography. Particularly for lithography applications, a compact wide-area x-ray source can produce from 1 to 40 mW/$cm^2$ x-ray radiation flux (depending upon the duration and repetition rate of the laser pulses) uniformly over an area (typically circular in shape) that is as large as 20 $cm^2$. Such an energetic high-intensity pulsed hard x-ray flux over such a large area is manifestly suitable for the masked exposure of photoresists in the production of semiconductors: the x-ray source, mask, resist and semiconductor substrate are placed tight together in simple close contact—obviating any need for focusing.

An x-ray source in accordance with the present invention has (i) a laser for producing a laser beam (a beam of laser light), and (ii) an electron source means, preferably photoemissive, that is capable of producing electrons in response to illumination by the laser beam and which is positioned for illumination by the laser beam. The x-ray source also includes (iii) a high voltage means energized to generate an electric field for accelerating, as an electron beam, the electrons produced by the impinging of the laser beam on the electron source means, and (iv) an electron beam target means positioned to intercept the accelerated electrons (electron beam) in order to produce x-rays in response thereto.

Preferably, the x-ray source further includes a high voltage switching means selectively operable to energize the high voltage means for a selected period of time for accelerating the electron beam during the selected time period to produce an x-ray pulse. Preferably, the high voltage switching means comprises an electrical switch selectively operable to selectively energize the high voltage means in response to, and in synchronism with, the laser beam pulses.

In another preferred embodiment, the x-ray source further includes a means for producing the laser beam as pulses in substantial temporal synchronization with the energization of the high voltage means.

In still another preferred embodiment, the x-ray source includes a field electrode means disposed between the electron source means and the electron beam target means for substantially suppressing the electron beam in response to deenergization of the high voltage means. Preferably, the field electrode means comprises an electrode positioned closer to the electron source means than to the electron beam target means.

In embodiments containing an electrode, it is preferred that the x-ray source further include a means for negatively voltage biasing the electrode relative to the electron source means for substantially maintaining the electrons produced by the electron source means in a region between the electrode and the electron source means in response to deenergization of the high voltage means.

A still further preferred embodiment of the x-ray source of this invention includes a means for directing the laser beam pulses onto a scattering sample (a sample for scattering the x-ray radiation) for energizing the scattering sample substantially simultaneously with illumination of the sample by the x-ray radiation.

Still another preferred embodiment of the x-ray source of this invention includes an x-ray switch means for switching x-rays received from the electron beam target means to produce an x-ray pulse. Preferably, the x-ray switch means comprises an apertured plate, such as a rotating plate, movable to selectively and alternately occlude and to pass the x-rays through an aperture for producing an x-ray pulse.

In one preferred x-ray source in accordance with the present invention, the electron source means comprises a photocathode, the electron beam target means comprises an anode, and the high voltage power supply is connected between the photocathode and the anode for generating the electric field used for accelerating the electrons produced by the photocathode as an electron beam that impinges the anode to produce the x-rays.

In another embodiment, the present invention contemplates a source of x-ray radiation comprising a laser source of laser light, a chamber evacuated to a high vacuum, a photocathode within the chamber for emitting electrons in response to illumination thereof by the laser light, an anode within the chamber spaced apart from the photocathode, and a high voltage source for electrically biasing the anode to a high voltage relative to the cathode for accelerating electrons emitted from the cathode as an electron beam to impinge upon the anode and to produce x-ray radiation. Preferably, a high voltage switch is connected to the high voltage source, the photocathode and the anode, for selectively biasing the anode with high voltage relative to the cathode in synchronization with the illumination of the photocathode by the pulses of laser light. Preferably, the high voltage switch is selectively operable for switching the biasing of the anode in response to and in synchronization with the pulses of laser light. Preferably, the high voltage switch comprises a semiconductor switch responsive to the pulses of laser light.

Preferably, the source of x-ray radiation of this invention further includes (i) a grid electrode within the chamber between the anode and the photocathode, and (ii) a voltage source for electrically biasing the grid electrode with a voltage, lower than the high voltage, for jointly limiting the drift of the emitted electrons under the space charge effect to a region of the chamber proximate the anode when the anode is not electrically biased with the high voltage, and (iii) a high voltage switch connected to the high voltage source and the photocathode for selectively applying the high voltage between the anode and the photocathode to produce pulses of emitted electrons accelerated from the photocathode through the grid electrode to impinge the anode, producing pulses of x-ray radiation.

The present invention still further contemplates an improvement to the photocathode element of the laser-activated, photoemissive, electron source. A metal, is preferably deposited on, or is alternatively mixed in bulk with, a semiconductor. The metal is preferably tantalum (Ta), copper (Cu), silver (Ag), aluminum (Al) or gold (Au) or oxides or halides of these metals, and is more preferably tantalum. The depositing is preferably by sputtering or annealing, and is preferably by annealing. The semiconductor is preferably cesium (Cs) or cesium antimonide ($Cs_3Sb$) or gallium arsenide (GaAs), and is more preferably cesium antimonide. A photocathode so formed exhibits efficient electron emission by the photoelectric effect and improved longevity.

In another embodiment, the present invention contemplates a method of producing x-ray radiation comprising illuminating a photocathode in a high vacuum with laser light, preferably at intermittent intervals, in order to produce electrons therefrom by the photoelectric effect and accelerating the produced electrons in a high voltage electric field to impinge on an anode in the high vacuum to produce x-ray radiation.

In an embodiment particularly suited for use in x-ray lithography the x-ray source of the present invention includes a laser light generator for producing laser light illumination over a spatially extended area and a spatially extended photoemitter means intercepting the laser light illumination over the spatially extended area in order to produce electrons by the photoelectric effect over the same spatially extended area. A high voltage source generates an electric field for accelerating the produced electrons as a wavefront of electrons, the wavefront again occurring over the spatially extended area. A spatially extended metal foil is positioned to intercept the wavefront of electrons over the spatially extended area of such wavefront, and, responsively to this interception, for producing x-rays. The x-rays so produced over a spatially extended area are particularly useful for lithography, including in the masked exposure of photoresist upon a semiconductor substrate where the substrate, photoresist, and mask are tight against (i.e., at a separation that is typically $\leqq 5$ micrometers) the metal foil.

These and other aspects and attributes of the present invention will become increasingly clear by reference to the following drawings and accompanying specification.

DETAILED DESCRIPTION OF THE PREFERRED EMBODIMENT

Figure 1:
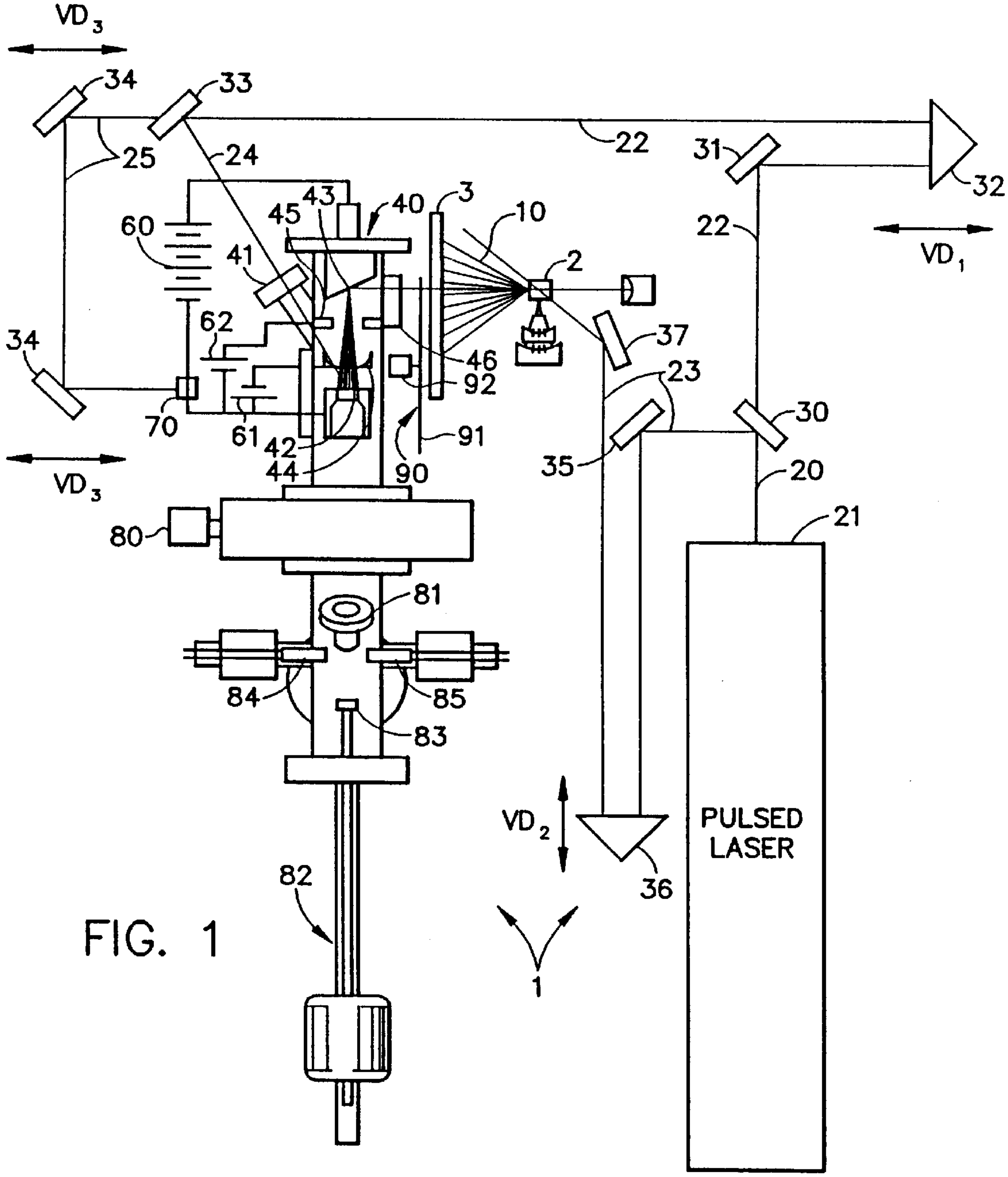
FIG. 1 is a block diagram showing a preferred embodiment of an ultrashort, picosecond, time-resolved x-ray source in accordance with the present invention in operational use for performing an x-ray diffraction experiment.

The present invention contemplates the production of x-rays in a high vacuum by (i) illuminating a photoemissive photocathode with high intensity laser light to cause the emission of copious electrons by the photoelectric effect, (ii) accelerating, and preferably focusing, the emitted electrons in and by a high voltage electric field established between the photocathode and an anode so as to form an electron beam, and (iii) striking the anode, which also serves as an electron beam target, with the accelerated (and focused) electron beam in order to produce x-ray radiation.

The present invention further contemplates the production of time-resolved x-rays, including nanosecond and shorter duration x-ray pulses. In order to do so multiple independent and separable techniques are employed.

First, the laser is cycled in operation so as to produce time-resolved light pulses, typically 20 picosecond light pulses at a repetition rate of 20 Hz. Alternatively, a laser producing 80 picosecond duration light pulses may be cycled at an 82 Mhz rate, giving an approximate 0.66% duty cycle. Typically pulses of an intermediate duration, nominally 10 picoseconds, are produced at an intermediate frequency, nominally 1 kHz.

Second, the electrons periodically emitted from the photocathode in response to the periodic laser light pulses are preferably accumulated in a spatial region near the photocathode—overcoming the normal dispersion of these electrons throughout the region between the photocathode and the anode which would be expected due to the space charge effect—by use of a grid electrode that is positioned between the photocathode and the anode. The grid electrode, typically biased at about 3 kV, functions to accumulate the emitted electrons in bunches. However, it so functions only upon, and during such times, that the much greater high voltage between the photocathode and the anode is switched off.

In accordance with an important third aspect of the present invention, the high voltage, typically approximately 100 Kv, between the photocathode and the anode is preferably switched on and off, preferably in a semiconductor switch that is responsive to the laser light pulses. The high voltage is switched on for a time period that spans the period of photoemission, and which is typically substantially coincident with the period of photoemission.

The use of a grid electrode, and the switching of the high voltage, are both optional: it is sufficient to create time-resolved x-rays only that the laser should be pulsed. However,use of the grid electrode and switching of the high voltage helps to keep the emitted electrons tightly grouped in "packets". When these electron packets ultimately strike the anode then the resulting time-resolved x-ray pulse is not appreciably longer than the laser light pulse.

In the preferred time-resolved x-ray source in accordance with the present invention each of the activities of (i)

photoemission, (ii) accumulation of photoemitted electrons, and (iii) switching of the high voltage is appropriately temporally sequenced and phased. Each laser light pulse (i) photoemissively generates abundant electrons which are (ii) accumulated in a narrow spatial region between the photocathode and anode and then, the high voltage being switched on, (iii) accelerated and focused into a short-duration time-resolved electron beam. The short-duration electron beam is typically equally as short as the laser light pulse from which it arose, or approximately 20 picoseconds in duration. It strikes the anode x-ray target in a tightly focused spot, typically of less than 0.5 mm diameter, producing an x-ray pulse of approximately 20 picoseconds duration and approximately 4–50 millijoules energy.

The picosecond x-ray pulse itself may be further gated, such as by having its leading or trailing edges truncated by passage through the x-ray transparent apertures of a rapidly rotating apertured plate.

The energy of the time-resolved x-ray pulses is a function of the high voltage, and is typically controlled to be of K, L, or M bands. Normally a high voltage of 100 KV is used to produce K band x-ray pulses. The intensity of the x-ray pulses is a function of (i) the intensity and duration of the laser light pulses, (ii) the efficiency of the photocathode, and (iii) the quantity of electrons that are accumulated between the grid electrode and the photocathode before being accelerated as a packet to the anode. X-ray pulses more intense than 4–10 microjoules, shorter than 20 picoseconds, and/or at duty cycles greater than 0.66% are possible.

The time-resolved x-ray source in accordance with the present invention is beneficially operated at pulsed x-ray energies, intensities, and duty cycles that do not require external cooling of the source. Particularly when the source used for photolithography then a photoresist is normally exposed to many individual x-ray pulses. Because of the reasonable energy within each of these pulses (roughly equivalent to a flashed synchrotron radiation x-ray source, the brightest previously known source), the total elapsed chronological and cumulative exposure times are reasonable in support of manufacturing production of semiconductors.

In use of the x-ray source in accordance with the present invention for x-ray spectroscopy, the picosecond x-ray pulses are preferably directed to illuminate with x-ray light a scattering sample that is excited in its energy state by the selfsame laser light pulses, appropriately time phased, that originally gave rise to the x-ray pulse. X-ray spectroscopy is thus promoted not only by the low cost and compact availability of x-ray pulses that are sufficiently short and sufficiently intense so as to permit observation by x-ray diffraction of the successive stages of time-variant molecular reactions, but is also promoted by a capability of synchronization of these reactions to the very x-ray pulses that permit the reactions to be observed in the first place. (It can alternatively be considered that the x-ray pulses are synchronized to the reactions.)

An x-ray source in accordance with the present invention has utility based on its (i) ability to produce time-resolved x-rays from continuous to picosecond and shorter duration, (ii) excellent focus providing an x-ray emission spot size that is typically less than 0.5 mm in diameter, (iii) ability to use different wavelengths of laser light that result in differing quantities of emitted electrons and intensities of resultant x-rays, including x-rays of microjoule intensities in picosecond intervals, (iv) capability to operate with over a range of high voltages in order to produce x-rays in the K, L, and M bands, (v) substantial lack of heat build-up when operated at a low duty cycle, (vi) compact, desk-top, size and (vii) general reliability and low cost.

A preferred embodiment of a time-resolved x-ray source in accordance with the present invention for producing picosecond duration K band x-ray pulses is diagrammatically illustrated in operational use for x-ray spectroscopy in FIG. 1. A scattering sample 2 is illuminated with ultrashort time-resolved x-ray pulses 10, typically of 20 to 50 picoseconds duration, to produce an x-ray image on an x-ray imaging device 3. The x-ray imaging device 3 is typically a photographic plate, or image intensifier, positioned in the Laue backscattering configuration. A goniometer (not shown), or other instrument for measuring angles, helps to align the position of scattering sample 2 with the x-ray beam 10 and with the x-ray imaging device 3.

The production of time-resolved x-rays 10 in x-ray source 1 commences with a laser beam 20 that is generated in a pulsed laser 21. The laser 21 is typically of the Nd-YAG type. One such type laser is Spectrophysics Model 3000 YAG laser. It is capable of producing 80 picosecond duration laser pulses at a repetition rate of up to 82 Mhz. A preferred pulsed laser 21 available from Quantel International is capable of producing up to 20 picosecond duration laser light pulses at a repetition rate of 20 Hz. Each laser pulse is of green light (approximately 5320 Å), and contains about 4 millijoules energy. The nominal 10 ps pulses (and even more commonly 6 ps pulses) at the nominal 1 kHz repetition rate (and even more commonly at any repetition rate from 300 Hz to 1 kHz) may be produced at, for example, a 193 nm wavelength with, for example, a commercially-available ArF excimer laser.

The laser light pulses 20 produced by pulsed laser 21 are split in first beamsplitter 30 into pulsed laser light beam lines 22, 23. The intensity of the laser light within each such beam line 22, 23 is not necessarily equal in accordance with the transmission, versus the reflection, characteristics of beamsplitter 30. Normally, and in accordance with the requirement for light power in each of the beam lines 22, 23, about 10% of the light 20 goes into beam line 22 and about 90% goes into beam line 23.

The laser light pulses within beam line 22 are reflected at mirror 31 and again in prism 32 to impinge upon second beamsplitter 33. The prism 32 may be moved a variable distance, $VD_1$, from both mirror 31 and beamsplitter 33 in order to induce a variable delay in the time of arrival of the laser light pulses at beamsplitter 33 and at subsequent points.

The beam line 22 is split by second beamsplitter 33 into beam lines 24 and 25. As with the beamsplitting performed by first beamsplitter 30, the light energy within each of beam lines 24, 25 need not be equal in accordance with the reflectivity, and transmission, characteristics of beamsplitter 33. Normally almost all of the light within beam line 22, about 99%, goes into beam line 24 and the remainder of the light, about 1%, goes into beam line 25.

The laser light pulses in beam line 24 are transmitted through light transparent window 41 of high-vacuum assembly 40 to illuminate photocathode 42. The window 41 is normally clear optical quartz. The high-vacuum assembly 40 maintains photocathode 42, and anode 43, in a high-vacuum at least less than $10^{-6}$ torr and, typically about $10^{-9}$ to about $10^{-10}$ torr. One such high-vacuum assembly suitable to contain the preferred configuration, and spacing, of photocathode 42 and anode 43 (discussed hereinafter) is manufactured by Huntington Mechanical Laboratories, 1400 Stierlin Road, Mountainview, Calif. 94043. Other high-vacuum chambers of other manufacturers are equally suitably adaptable to the purposes of the present invention.

The photocathode 42 and anode 43 each have a preferred configuration, a preferred separation, and are each preferably constructed of certain materials. The configuration and separation of the photocathode 42 and anode 43 is a function of the desired shaping of the electron beam between such photocathode 42 and anode 43, and the magnitude of the high voltage that exists between such photocathode 42 and anode 43. One preferred program for the calculation of the geometries, and separations, of both photocathode 42 and anode 43 is available from Stanford University as SLAC Electron Optics Program Vector POT./PLOTFILE version of July 1979. That computer program is directed to the calculation of the contours of a spherical anode that is used within an electron gun. It is publicly available from the Linear Accelerator program of Stanford University.

Figure 2:
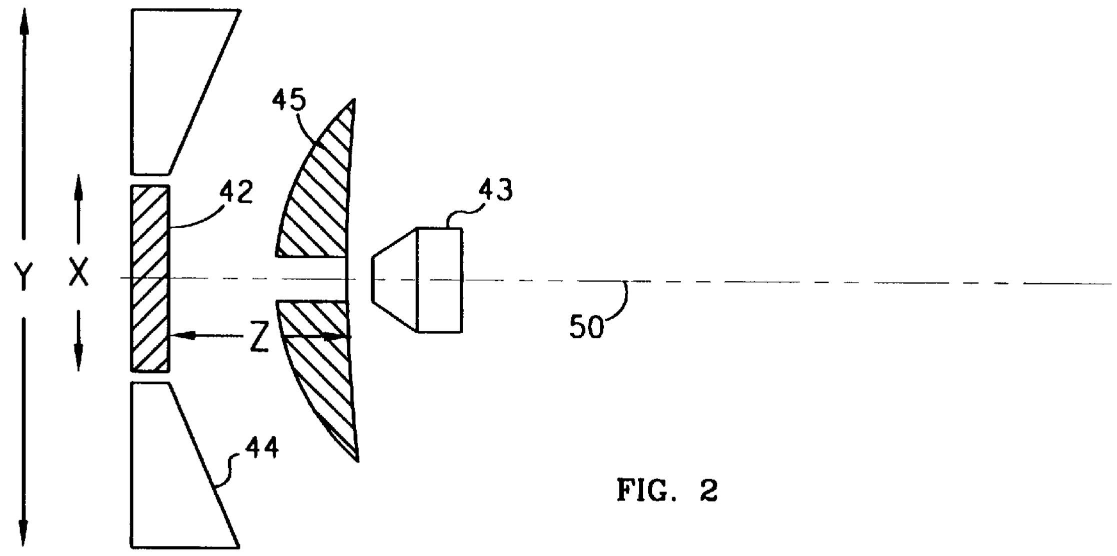
FIG. 2 is a cross-sectional plan view of the photocathode, anode, grid electrode and focusing plates within the preferred embodiment of an x-ray source shown in FIG. 1.

A preferred configuration and separation calculated by the SLAC Electron Optics Program for the photocathode 42 and anode 43 is shown in cross-sectional plan view in FIG. 2. The grid electrode 44 and the focusing plates 45 are also shown.

Each of the photocathode 42, anode 43, grid electrode 44 and focusing plates 45 exhibit substantial circular and radial symmetry about an imaginary line of focus 50. The only substantial deviation from circular and radial symmetry is evidenced by the small front surface, oriented in the direction toward photocathode 42, of anode 43. That planar surface is typically angled at 45° relative to line of focus 50 and relative to x-ray pulses 10 (to be discussed), as is best shown in FIG. 1.

The distance X, or diameter of the photocathode, is typically about 1.75 centimeters (0.69 inches). The grid electrode 44, preferably in the shape of an annular ring having the indicated cross section and located in a position surrounding the photocathode 42, has a diameter Y of approximately 5.08 centimeters (2 inches). Its central aperture is approximately 1.78 centimeters (0.7 inches) in diameter, which is sufficient to tightly accommodate the 1.75 centimeter (0.69 inch) diameter of photocathode 42. The front surface of anode 43, which is typically about 0.254 centimeters (0.1 inches) in diameter, is nominally located at distance Z=about 1.65 centimeters (0.65 inches) from the surface of photocathode 42. The major diameter of anode 43 is approximately 0.89 centimeters (0.35 inches).

The one or more focusing plates 45, which are normally of spheroidal contour with a central aperture, are located approximately half way between cathode 42 and anode 43, or about 0.82 centimeters (0.32 inches) from either. The focusing plates 45 are typically of hemispherical contour. The configurations, and separations, of photocathode 42, anode 43, and focusing plates 45 is directed to sharply focusing an electron beam to a minimum size point on the surface of anode 43 when an approximate 100 kilovolts electrical potential is applied between anode 43 and photocathode 42.

In accordance with the present invention, the material of photocathode 42 is improved over a similarly-employed photocathode reported in the article "Practical laser-activated photoemissive electron source" by Lee, et al., appearing in *Rev. Sci. Instrum.*, Vol. 56, No. 4: pp. 560–562 (April 1985). Lee, et al. describe a cesium antimonide ($Cs_3Sb$) photocathode that is alleged to be an improvement on previous gallium arsenide (GaAs) and bialkali photocathode materials. In accordance with the present invention metal is added to a semiconductor material by mixing or, preferably, by depositing through sputtering or by annealing. The metal is preferably tantalum (Ta), copper (Cu), silver (Ag), aluminum (Al) or gold (Au), or oxides or halides of these metals (where possible). The semiconductor is preferably cesium (Cs), cesium antimonide ($Cs_3Sb$) or gallium arsenide (GaAs). A preferred cathode is constructed from tantalum (Ta) annealed on the surface of nickel ($Cs_3Sb$). Such a cathode exhibits excellent efficiency in the production of electrons by the photoelectric effect in response to incident green light ($\lambda \approx 193$ nm), and exhibits many times, approximately four times (×4) the fifty (50) hour service lifetime reported by Lee, et al.

The anode 43 is preferably made of zirconium (Zr) copper (Cu) or molybdenum (Mo), but other known materials for producing x-ray radiation when bombarded with high-energy electrons are also suitable.

Returning to FIG. 1, a high voltage electrical potential is provided between anode 43 and photocathode 42 by high voltage power supply 60. The high voltage of power supply 60 is typically 100 Kv. However, it will be understood that for the purposes of the present invention "high voltage" is any accelerating potential that is suitable for speeding up the electrons in a beam of a cathode ray tube.

In accordance with the principles of the invention for the production of time-resolved x-ray pulses, the nominal 100 Kv voltage of high voltage power supply 60 is not necessarily continually applied between photocathode 42 and anode 43. Rather, such high voltage may be gated in the circuit including photocathode 42 and anode 43 by action of semiconductor switch device 70.

It is not required in order to produce time-resolved x-ray pulses that the high voltage power supply 60 should be gated by semiconductor switch device 70. It is sufficient only that the laser light, and the resulting photoemission of electrons should be pulsed. Moreover, it is not a trivial matter to switch 100 Kv in a few picoseconds, and undesirable arcing may occur between photocathode 42 and anode 43 if the vacuum is not $10^{-9}$ torr or less, The reason that the high voltage is desirably switched, despite the care that must be given to this procedure, is to better permit the close spatial proximity of photocathode 42 and anode 43, and the effective acceleration of the emitted electrons in bunches, or packets, i.e., in pulses. Particularly if photocathode 42 and anode 43 are at great separation (undesirably allowing the electrons to disperse during their flight from the photocathode to the anode), it will be recognized by a practitioner of electron gun design that it may not be necessary or worthwhile to switch the high voltage.

The semiconductor switch device 70 is preferably made from heavily $P^+$ doped silicon. It is typically about 0.1 mm depth×about 3 mm width×about 5 mm length. It may be particularly constructed from a $LiTaO_3$ crystal doped with 2.24% Cu as taught in the article OPTICAL GENERATION OF INTENSE PICOSECOND ELECTRICAL PULSES by Auston, et al. appearing in *Appl. Phys. Lett.* Volume 20, No. 10: pp. 398–399 (May 15, 1972). The copper (Cu) impurities have a strong absorption at 1.06 $\mu$m.

The beam line 25 of laser light pulses from laser 21 is reflected in two mirrors 34, which may be jointly located at a variable distance $VD_3$ from beamsplitter 33 and from semiconductor switch 70, so as to impinge upon semiconductor switch 70. A prism may alternatively be used in substitution for the two mirrors 34. Each laser light pulse striking the semiconductor switch 70 generates a macroscopic polarization in such switch resultant from the difference in dipole moment between the ground and excited states of the absorbing $Cu^{++}$ impurities. The semiconductor switch 70 will be turned on, conducting the nominal 100 Kv high voltage from power supply 60 to be applied between photocathode 42 and anode 43, during the duration of each laser pulse (nominally 20–50 psec in duration). At other times the semiconductor switch 70 will be turned off and the high voltage from high voltage power supply 60 will not be applied between photocathode 42 and anode 43. The switching action of the preferred semiconductor switch 70 is exceptionally fast, on the order of 2 psec or less.

Because lasers can produce light pulses of femtoseconds duration, and because the switching time of the laser-light-activated semiconductor switch that switches the high voltage is on the order of a few picoseconds or less, the principles of the present invention are applicable to producing x-ray pulses of even shorter than 20 picoseconds duration. The shape and separation of the photocathode and the anode must, however, be precisely controlled in order to prevent electron beam dispersion, and resultant lengthening of the x-ray pulses.

It is not essential that a laser-light-activated semiconductor switch be used to switch the application of the high voltage supplied by high voltage power supply 60 between the photocathode 42 and anode 43. For example, a magnetron may alternatively be used. Such a magnetron would normally be triggered in its switching action by an electrical circuit that is sensitive to the laser light pulses on beam line 25. Such circuits, and magnetrons, are commonly understood but are deemed less suitable, and slower, than the preferred semiconductor switch. If a magnetron is used, it may be considered to occupy the location in FIG. 1 that is identified by numeral 70.

Continuing in FIG. 1, a grid electrode 44 voltage biased by intermediate voltage power supply 61 may be used to improve the bunching of electrons emitted from photocathode 42. As may best be observed in FIG. 2, the grid electrode 44 is positioned surrounding the photocathode 42. The focusing electrode(s) 45 are typically spaced at a separation of 0.82 centimeters (0.32 inches) from each of the photocathode 42 and anode 43. The grid electrode 44 is negatively biased relative to photocathode 42 by first intermediate voltage power supply 61, nominally 3 Kv. The focusing plates 45 are biased relative to photocathode 42 by second intermediate voltage power supply 62, nominally also 3 Kv. Both the first intermediate voltage power supply 61 and the second intermediate voltage power supply 62 may exhibit a range of voltages, typically 2–8 Kv. It is normally preferred that the voltage of second intermediate voltage power supply 62, and the voltage on focusing plates 45, should be equal to or greater than the voltage of first intermediate voltage power supply 61, and the voltage on grid electrode 44.

It may be noted that the voltage bias, and the electric field within the vacuum assembly 40, that is created by the first intermediate voltage power supply 61 is of an opposite polarity to the voltage, and electric field, created by the high voltage power supply 60. The first intermediate voltage power supply 61 could optionally be switched off, such as by an oppositely phased counterpart switch to semiconductor switch 70, at the same time that high voltage power supply 60 is switched on. However, this additional switching is not necessary because the electric field created by first intermediate voltage power supply 61 is insignificant in comparison to the electric field created by high voltage power supply 60.

Certain additional structure is usefully attached to high vacuum assembly 40 in order to support the renewal of photocathode 42. The photocathode 42, preferably made of tantalum-surfaced cesium antimonide (Ta on $Cs_3Sb$), is subject to having its surface ablated by the high intensity laser light impingent upon it from beam line 24. It periodically needs renewal, typically after greater than 200 hours of use at a higher, 0.66%, duty cycle. In order to do so, an x-ray tube isolation valve 80 is opened. The photocathode 42 is withdrawn into the area under deposition monitoring view port 81 by use of a rotary-translation feedthrough, or transfer device, 82. The distal, or operative, end of rotary translation feedthrough device 82 comprises a cathode holder 83. This cathode holder 83 is moved in position while the x-ray tube isolation valve 80 is open so as to engage photocathode 42 and move it to position under deposition monitoring view port 81. At a later time the cathode holder 83, and the rotary-translation feedthrough device 82, is used to restore photocathode 42 to its normal, operative, position as illustrated.

When the photocathode 42 is positioned under the deposition monitoring view port 81 it is supplied with fresh cesium from cesium dispenser 84 and with fresh antimony from antimony dispenser 85. This deposition is normally performed by sputtering in a high vacuum. At the conclusion of the deposition the surface of photocathode 42 is substantially renewed, and the photocathode 42 may be redeployed for a further period of producing copious electrons by the photoelectric effect. By a slightly differing mechanical arrangement (as illustrated) two cathodes may be employed, with one in use while the other is being resurfaced or held in reserve. The rapidity of cathode renewal and substitution is generally of greater importance when the x-ray source 1 is used in a production, as opposed to a research, environment.

The x-ray pulses 10 that are produced at anode 43 exit the high-vacuum assembly 40 through an x-ray transparent window 46 that is typically made of beryllium (Be).

The x-ray pulses 10 may optionally be gated in their path to scattering sample 2 by an x-ray gating device 90. Such a device may be, for example, an apertured plate, or disk, 91 that is driven by a motor 92. The apertured disk 91 is made of a material that is substantially opaque to x-rays, for example lead (Pb). The apertures are transparent to x-rays. The normal rotational speed of apertured disk 91, which is typically several hundred revolutions per minute, is normally not sufficient so as to gate the passage of an x-ray pulse 10, essentially traveling at the speed of light, between the anode 43 and the scattering sample 2 when such pulse is only 20–50 picoseconds (6–10 millimeters at the speed of light) in length.

The gating performed by the apertures within the rotating apertured disk 91 can, however, be phased so that such rotating apertured disk 91 serves to truncate either the beginning, or the end, of a time-resolved x-ray pulse. Additionally, it should be understood that the time-resolved x-ray source 1 in accordance with the present invention need not operate exclusively to produce ultrashort, picosecond duration, x-ray pulses. In the event that the x-ray production is continuous, or is produced in pulses of typically millisecond time duration, the x-ray gating assembly 90 may usefully serve to gate the application of x-ray pulses 10 to scattering sample 2.

The preferred material, and thickness, of the rotating apertured disk 91 is dependent, as is well in the art, on the energy level of the x-ray pulses 10 which are intended to be gated. The "opaque" and "transparent" regions of the disk 91 may substantially block or pass the x-rays 10, or may attenuate such x-rays 10 to a variable degree. Normally the optional x-ray gating assembly 90 is not employed, but, if it is employed, it may serve as a useful secondary means of controlling, and gating, both the timing and the intensity application of x-ray radiation to an x-ray target object such as scattering sample 2.

In operation of the x-ray source 1 for the production of continuous x-ray radiation, a continuous laser light beam produced by a laser 21 continuously impinges upon a photocathode 42 that is located in a high vacuum in order to cause such photocathode 42 to continuously emit numerous electrons by the photoelectric effect. The emitted electrons are continuously accelerated, and focused, in a continuous high voltage electric field that is produced by high voltage power supply 60, so as to continuously strike anode 43 at a small focal spot, typically 0.5 mm or less in diameter. The resulting x-rays are used to illuminate a scattering sample 2, or other x-ray target.

Use of the x-ray source 1 in the production of time-resolved x-rays proceeds equivalently. In this use a pulsed laser 21 produces time-resolved pulses of high intensity laser light. Each such laser light pulse causes the photoemission of electrons from photocathode 42. The emitted electrons are preferably maintained in a spatial region that is proximate to photocathode 42, and separated from anode 43, by use of a negatively-biased grid electrode 44. Upon such time as a cloud of electrons has been accumulated in the region between the photocathode 42 and grid electrode 44 within the high vacuum chamber 40, a laser light pulse turns on the semiconductor switch 70 in order to apply the high voltage from high voltage power supply 60 to photocathode 42 and anode 43. Even though the first intermediate voltage power supply 61 is not normally turned off, the accumulated electrons are accelerated from photocathode 42 through electrode 44 to anode 43 as a tightly focused electron beam, or beam packet. The beam packet of electrons strikes the anode 43, or any other electron target that is substituted in their line of flight, with high energy, producing a pulse of x-ray radiation. This pulse of x-ray radiation, which is optionally gated and/or attenuated by a further x-ray gating means 90, impinges upon the scattering sample 2, or other x-ray target.

In accordance with still another aspect of the present invention, the scattering sample 2 is energized, including for the initiation and/or maintenance of a molecular reaction therein, by the same laser light pulses that give rise to the x-ray pulses.

This light energization of scattering sample 2 is accomplished by directing the laser light pulses on beam line 23 with mirror 35, prism 36, and mirror 37 to impinge on scattering sample 2. The prism 36 may be moved a variable distance, $VD_2$, relative to mirrors 35, 37 in order to adjust the time at which laser light pulse line 23 is incident upon scattering sample 2 relative to the time at which x-ray pulses 10 are received at the same scattering sample 2. Due to the relatively slow passage of the electron beam packet between photocathode 42 and anode 43 within high vacuum assembly 40, the time of incidence of the laser pulses on beam line 23 at scattering sample 2 may be readily adjusted to be either earlier than, coincident with, or later than, the time of arrival of the x-ray pulses 10 at the same scattering sample 2. The present invention thus contemplates not only the economical and compact production of ultrashort time-resolved x-ray pulses, but also the convenient initiation and energization of molecular reactions that may usefully be examined with such ultrashort time-resolved x-ray pulses.

The x-ray source 1 is aligned. A preferred alignment of time-resolved x-ray source 1 enables the high voltage to be applied between photocathode 42 and anode 43 for the duration of the photoemission from photocathode 42. If the high voltage power supply 60 is not to be switched by device 70, then adjustment of delay $VD_3$ makes it a simple matter to trigger a photodiode, or other light sensor device, to turn on high voltage power supply 60. This turn on typically transpires about 5 nsec before the arrival of the light pulse at photocathode 42 via beam line 24. In other words, beam line 25 is about 1.5 meter (5 feet) shorter to the point where it is sensed than is beam line 24 to the photocathode 42. The power supply 60 is typically turned off after a predetermined time delay, normally of several microseconds.

If the high voltage from high voltage power supply 60 is to be switched by semiconductor switch device 70 to photocathode 42 and anode 43 simultaneously that the laser light pulse arrives at photocathode 42 via beam line 24, then a more exacting alignment of x-ray source 1 is necessary. In order to conduct this alignment, both the semiconductor switch device 70 and the photocathode 42 are normally temporarily replaced with photodiodes. The arrival of the laser pulse at the two points is made to be coincident, to the limits of observational accuracy and jitter, by observing the coincidence of both photodiodes' signal outputs on an oscilloscope, and by adjusting the length beam line path 25. The shortening or lengthening of beam line path 25 is at the scale of 1 psec≈0.3 mm.

The actual physical beam line paths 24 and 25 are obviously not spatially laid out as illustrated in FIG. 1, which is diagrammatic only. It is within the ability of a user of a laser to adjust the length of an optical path, and to correlate in time events occurring on two such paths.

It may be useful to temporally spread out, or dispense the arrival of the laser pulse on beam line 25 at semiconductor switch device 70. In such a case a solution of bromobenzene in a glass tube may be placed in the beam line 25.

It should be understood that it is not absolutely necessary for the laser light pulse that activates the semiconductor switch to be synchronized (temporally coincident) with the laser light pulse that causes the photoemission. Photoemission and electron accumulation can precede acceleration and focusing of the electron beam. Especially if a very intense x-ray pulse is preferred to a very short one, it may be advantageous to accrue electrons before switching on the high voltage.

In accordance with the preceding discussion, certain adaptations and alterations of the invention will suggest themselves to practitioners in the art of designing x-ray sources. The temporal phasing between the various activities performed in and by the x-ray source in accordance with the present invention is widely variable. There need not even be a one-to-one correspondence between each such activity. For example, the accumulation of electrons in the region between electrode 45 and photocathode 42 could transpire for several laser light pulses. There need not be just one semiconductor switch 70. Another such semiconductor switch, alternately phased, could be applied to the first intermediate voltage power supply 61. The switching of the high voltage power supply need not be by a semiconductor switch, but could, alternatively, be by an appropriately time-synchronized magnetron switch. Indeed, there may be no switching of the high voltage power supply at all. There need not be just one laser used in the x-ray source. Multiple lasers, appropriately phased and adapted in frequency and intensity relative to the separate tasks performed, could be employed.

The x-ray source in accordance with the present invention is adaptable to a wide range of (i) x-ray frequencies, (ii)

x-ray intensities, and (iii) x-ray pulse lengths from continuous to picosecond and shorter duration. A single x-ray source is, however, normally inefficient over an operational range that is simultaneously broad in all of the many variables. This inefficiency results from a requirement for optimizing the configurations, and spacing, of the photocathode 42 and anode 43 that cannot simultaneously be satisfied for a great range of many differential operational conditions. However, x-ray sources in accordance with the present invention can readily be constructed to efficiently provide a broad range of x-ray frequencies, intensities, and pulse durations that are useful to diverse x-ray spectroscopy and x-ray lithography activities, and to other activities requiring time-resolved x-rays.

One embodiment of the invention is a pulsed x-ray source particularly directed for use in x-ray lithography. Using a tantalum film as the photocathode material and 266 nm picosecond pulses from a pulsed mode locked Nd:YAG laser, electron bunches with a charge of 3 nC per pulse have been generated. These electron pulses are accelerated and focused onto a copper anode to produce x-ray pulses with time width of a 20 ps and a brightness of $6.2\times10^{6}$ $cm^{-2}$ $sr^{-1}$ at the Ka wavelength (1.54 Å).

The use of deep ultraviolet, 193 nm, light combined with the use of pure metal photocathodes is a very efficient as a source of electrons, and hence of x-rays. The advantages of a metal photocathode include a quantum efficiency of the order of approximately $10^{-3}$, a guaranteed long life at a moderate vacuum, and reliability over hundreds of hours of use without incurring any observable deterioration or variation in performance. In addition, the use of pulsed radiation makes possible the generation of a very high peak photocurrent. High power x-ray pulses, with an average power of 5 $Mw/cm^2$ and a peak power of 20 $Mw/cm^2$, can be emitted from surface areas as large as 10–20 $cm^2$ and larger.

The wide area x-ray source in accordance with the present invention can accordingly be used in a simple close-contact arrangement of the X-ray mask and the resists—without the need of focusing! Because of the high intensity, short, X-ray pulses produced, the chemical amplification process in the resist is increased—resulting in a much higher yield.

In its wide-area embodiment the present invention is a compact, high intensity, inexpensive, reliable, tunable pulsed x-ray (PXR) source providing reproducible x-ray pulses with an intensity, up to approximately 20 $mW/cm^2$, that is comparable to that of other sources, such as impact tubes and laser-driven plasma-based sources.

Figure 3:
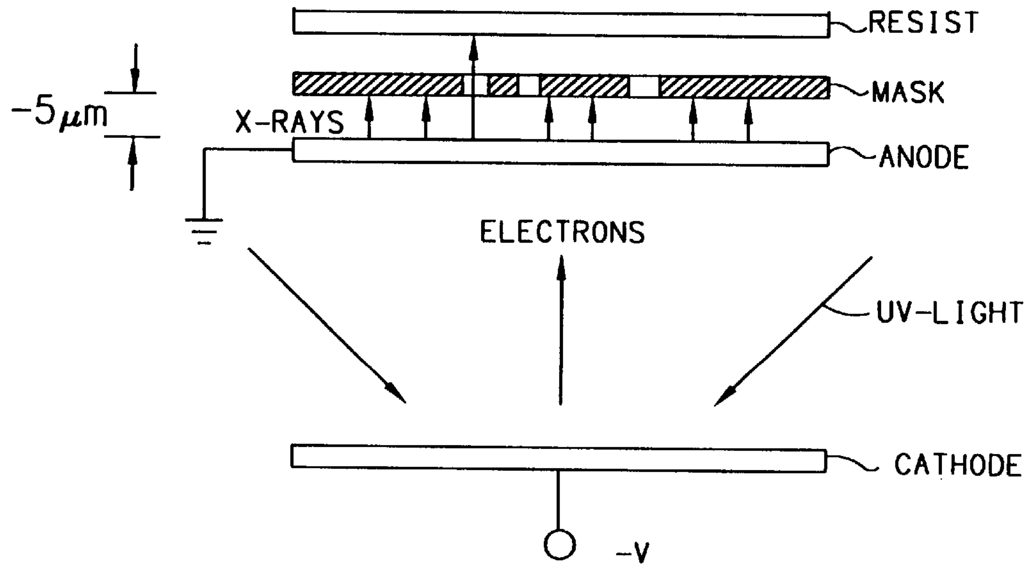
FIG. 3 is an enlarged cross-sectional view of the cathode and anode of an alternate, through-path-transmitting, x-ray source in accordance with the present invention in position, and in use, for lithography.

The wide-area x-ray source consists of a simple plane diode, as illustrated in FIG. 3. The photocathode is made from a pure metal having a low work function, such as, for example, Ta, Sm or Ni. The metal photocathode is irradiated with laser pulses, preferably 193 nm laser pulses. Each electron bunch that is emitted in response to a corresponding laser pulse is accelerated to, and is focused onto, the anode by means of high electric fields. (The focusing is obviously over a much larger area, normally ranging to a circular area of up to 20 $cm^2$, than is the focusing occurring in the previous embodiment of FIGS. 1 and 2—which previous embodiment may be directed to producing a point x-ray source. Nonetheless, the electron bunch of the wide-area source is spoken of as being "focused" into a wavefront because its dispersion, and its spatial extent (even if over a relatively extended area) are obviously managed and controlled.)

The anode is a thin metal foil which emits x-rays in the forward direction under electron impact. Note that this is opposite to the previous embodiment of FIGS. 1 and 2. For this reason the wide area source is sometimes described as "through-path-transmitting", meaning that the electron and the x-ray radiation are along the same axis, and in substantially the same direction. Low Z number metals are preferred for the anode because they emit x-rays at longer wavelengths, such as the characteristic radiation of Al at 0.83 nm.

In order to evaluate the output x-ray power of the wide-area X-ray source in accordance with the present invention the main characteristics of its diode construction should be considered. In the pulsed mode of operation, when the transit time $t_t$ of the electrons across the diode is less than the laser pulse duration $t_p$, the peak current density is given by:

$$J=q/t_p$$

where q is the available charge on the cathode. The maximum value of q per unit area is given by $$q=E_o\times V/d$$

where V is the applied voltage and d is the separation of the anode and cathode.

If we assume a cathode area of 1 $cm^2$, d=1 cm and V=200 KV, the transient regime takes place for laser pulses shorter than 100 ps while the available electrons per unit area of the cathode are $1.1\times10^{11}$ electrons/$cm^2$. For a photo-cathode quantum efficiency of $10^{-4}$ a laser energy of 1.0 $mJ/cm^2$ per pulse in required. Assuming an Aluminum anode, the efficiency of the Ka line production will be of the order of $10^{-3}$, which means that 1.6 $\mu J/cm^2$ of x-rays in the forward direction will be produced per pulse.

With a quite reasonable 50% transmission of the anode and substrate, a 0.8 $\mu j/cm^2$ energy density per pulse is produced on the working surface. This requirement for laser light illumination should be compared with the with certain UV radiation generating lasers (193 nm is discussed below) currently available in the U.S.A. market (circa 1991), which lasers operate at a repetition rate up to 300 Hz. Thus, the average output is 240 $\mu j/cm^2$. Therefore, a pulsed laser system using an ArF amplifier with 20 mJ/pulse will be able to irradiate 20 $cm^2$ of mask area simultaneously.

The production of electrons may be increased by a factor of 10 or more by using 193 nm wavelength irradiation because quantum efficiency is related to the laser energy by $$n=A_{(z)}(hv-W_o)^2$$

where $A_{(z)}$ is a constant characteristic of the metal, hv is the laser photon energy and $W_o$ is the work function of the metal. This equation shows that the electron production quantum yield increases with the square of difference between the photon energy and work function. An increase by at least a factor of 10 is realized by use of 193 nm laser pulses.

In order to take full advantage of the enhanced quantum efficiency as the work function energy is exceeded, a new and powerful source of 193 nm photons is required. In accordance with the present invention, a new and powerful 193 nm x-ray source is based upon the use of an argon-fluoride laser as an amplifier. It is constructed as follows: A Nd:YLF laser emitting laser light at 1057 nm is up-converted in frequency to generate pulses at 527 nm, 265 nm and 211 nm wavelengths at a 1 Khz repetition rate. This manner of frequency conversion is known in the art.

The 527 nm beam is next used to pump a dye laser which emits 728 nm light. The next step involves the frequency mixing, in a Barium Borate (BBO) crystal, of the 728 nm dye laser pulse with the 263 nm fourth harmonic of the frequency-converted primary laser pulse so as to generate a "seed" pulse at 193 nm wavelength. This part has not been done previously. Calculations show that there is a phase matching angle, and because the BBO crystal transmits about 50% at 192 nm, a strong seed pulse is generated for subsequent amplification.

While the common argon-fluoride laser has not been used extensively as an amplifier at 193 nm, other excimer lasers, such as the KrF laser at 248 nm, have been used with very satisfactory results for a long time.

The complete wide-area x-ray source in accordance with the present invention, as described, is inexpensive. The main components of the system are currently available in the U.S.A. scientific market. The development of the 192 nm "seed" pulse is new, but straightforward. The 300 Hz rate is limited only by the ArF amplifier. However, new excimer amplifiers—such as one from Lambda Physik with a 1 Khz rep-rate—are regularly entering the market. Regenerative amplifiers with YAG and YLF crystals offering repetition rates up to 1 kHz are commercially available now with 1 KHz now, and prototype lasers for laboratory use are available with repetition rates up to 10 Khz. For a complete solid state system, the dye laser/amplifier stage of the present invention can alternatively be replaced with a Ti-sapphire laser.

A table top wide-area x-ray source is thus able to produce x-ray radiation with average intensity in the range of 1 $mW/cm^2$ over an area of 20 $cm^2$. The x-ray wavelength most convenient will be in the range of 0.1 nm to 1 nm. If, instead of picosecond pulse, longer 10–20 ns pulses are used then higher average powers, can be generated, i.e., 20–30 $mW/cm^2$ of x-rays in a 20 $cm^2$ area and with very little shot to shot variation because of the electron saturation of the diode. The x-ray irradiation area can be increased to 40 $cm^2$ or more without loss in the per $cm^2$ flux, by simply increasing the diameter of the amplifier.

Since the x-ray output of the source is of large size a contact mask will be most suitable, as illustrated in FIG. 3. The mask is normally placed tight against the anode at a separation $\leqq 5$ micrometers. One preferred configuration involves the use of a mask and thick absorber. The thickness of the absorber is desirably more than an order of magnitude larger than the resolution limit. The thick absorber improves the contrast of the mask. Additionally, the distance between x-ray plate and the mask must be as small as possible (less than 5 micrometers). The high peak power of the x-ray will be advantageous for resists with chemical amplification since large numbers of electrons are produced in the exposed area within the short duration of the x-ray pulse—thus increasing the chemical amplification.

A laser-induced pulsed wide-area x-ray source in accordance with the present invention typically generates 1–10 $mW/cm^2$ of x-rays from picosecond duration laser pulses, and 20–40 $mW/cm^2$ of x-rays from 20 ns, 193 nm pulses. The pulse repetition rate is 300 Hz minimum, 1,000 Hz typical. A table top size induces stable (±15%) x-ray pulses over large irradiation areas. The x-ray pulses are highly reliable, providing trouble free operation for hundred of hours.

In accordance with the preceding explanation, the present invention should be interpreted broadly, in accordance with the following claims, only, and not solely in accordance with that preferred embodiment within which the invention has been taught.

What is claimed is:

1. An x-ray source for producing x-ray illumination over an area of a workpiece semiconductor substrate, the source comprising:

a laser beam generating means for producing a laser light beam having a cross-sectional area substantially as large as the area of the workpiece semiconductor substrate;

a photoelectron emitter means, intercepting the laser light beam over a light intercept area substantially as large as the laser light beam cross-sectional area, for producing electrons by the photoelectric effect over an electron production area substantially as large as the light intercept area;

a high voltage means for generating an electric field for accelerating the produced electrons as an electron beam wavefront over an area substantially as large as the electron production area;

a metal foil, positioned to intercept the electron beam wavefront over substantially its entire area, for producing x-rays over substantially the entire electron intercept area in response thereto;

wherein because the x-rays are produced over substantially the entire electron intercept area, because the electron intercept area is substantially the entire area of the electron beam wavefront, because the area of the electron beam wavefront is substantially as large as the area of light intercept, because the area of light intercept is substantially as large as the laser light beam cross-sectional area, and because the laser light beam cross-sectional area is substantially as large as the area of the workpiece semiconductor substrate, the x-rays are produced over an area that is also substantially as large as the area of the workpiece semiconductor substrate.

2. The x-ray source according to claim 1 wherein the laser beam generating means comprises:

a laser means for producing pulses of laser light that constitute a temporally intermittent laser beam.

3. The x-ray source according to claim 1 comprising:

a high voltage switching means selectively operable to energize the high voltage means for a selected period of time for producing said wavefront of electrons during said period of time.

4. The x-ray source according to claim 3 wherein the laser beam generating means comprises:

a means for producing said laser beam as pulses in synchronization with the energizing of the high voltage means.

5. The x-ray source according to claim 4 wherein the high voltage switching means comprises:

an electrical switch selectively operable to energize the high voltage means in response to and in synchronization with said laser beam pulses.

6. The x-ray source according to claim 1 wherein the spatially extended photoelectron emitter means comprises:

a photocathode;

wherein the spatially extended metal foil comprises:

an anode;

and wherein the high voltage means comprises:

a source of a high voltage potential between the anode and the cathode.

7. The x-ray source according to claim 1 wherein the photoelectron emitter means consists essentially of pure metal having a low work function.

8. The x-ray source according to claim 7 wherein the pure metal having a low work function consists essentially of a metal from the group of Ta, Sm, and Ni.

9. The x-ray source according to claim 1 wherein the metal foil consists essentially of aluminum.

10. The x-ray source according to claim 1 wherein the spatially extended photoelectron emitter means comprises:

a substantially planar photocathode;

and wherein the spatially extended metal foil is substantially planar.

11. The x-ray source according to claim 1 wherein the spatially-extended photoelectron emitter means comprises:

a spatially-extended photocathode consisting essentially of a semiconductor in combination with a metal.

12. The x-ray source according to claim 11 wherein the spatially-extended photocathode's semiconductor is selected from the group consisting essentially of cesium and cesium antimonide and oxides pf cesium and cesium antimonide.

13. The x-ray source according to claim 11 wherein the spatially-extended photocathode's metal is selected from the group consisting of tantalum, copper, silver, aluminum and gold, and oxides of tantalum, copper, silver, and aluminum, and halides of tantalum, copper, silver, and aluminum.

14. The x-ray source according to claim 11 wherein the spatially-extended photocathode spatially-extended photocathode consists essentially of the metal deposited on the surface of the semiconductor.

15. The x-ray source according to claim 11 wherein the spatially-extended photocathode consists essentially of the metal substantially homogeneously mixed in bulk with the semiconductor.

16. The x-ray source according to claim 11 wherein the spatially-extended photocathode's semiconductor comprises:

a substrate;

and wherein the photocathode's metal comprises:

a layer upon the semiconductor substrate.

17. The x-ray source according to claim 16 wherein the spatially-extended photocathode's metal layer is sputtered on the photocathode's semiconductor substrate.

18. The x-ray source according to claim 16 wherein the spatially-extended photocathode's metal layer is annealed to the surface of the photocathode's semiconductor substrate.

19. A method of producing x-ray illumination over an area of a workpiece semiconductor substrate, the method comprising:

illuminating with a laser light beam having a cross-sectional area that is substantially as large as the area of the workpiece semiconductor substrate an area of a photoelectron emitter in order to produce electrons by the photoelectric effect over the photoelectron emitter area;

generating a high voltage electric field in order to accelerate the produced electrons as a wavefront of electrons, the wavefront occupying an area substantially as large as the photoelectron emitter area from whence the electrons arose; and intercepting the wavefront of electrons with an area of metal substantially as large as the wavefront in order to produce x-ray radiation over an area of intercept substantially as large as the wavefront of electrons;

wherein the cross-sectional area of the laser light beam, the photoemitter area, the area of the wavefront of electrons, the area of intercept, and the x-ray produced radiation are all substantially the same size, and are all substantially as large as the area of the workpiece semiconductor substrate.

20. The method of producing x-ray illumination over a spatially extended area according to claim 19 wherein the illuminating comprises:

illuminating with the laser light the spatially extended area of a spatially-extended photocathode consisting essentially of a semiconductor in combination with a metal.

21. The method of producing x-ray illumination over a spatially extended area according to claim 20 wherein the illuminating of the spatially-extended photocathode consisting essentially of a semiconductor in combination with a metal serves to illuminate a semiconductor selected from the group consisting essentially of cesium and cesium antimonide and oxides of cesium and cesium antimonide.

22. The method of producing x-ray illumination over a spatially extended area according to claim 20 wherein the illuminating of the spatially-extended photocathode consisting essentially of a semiconductor in combination with a metal serves to illuminate a metal selected from the group consisting of tantalum, copper, silver, aluminum and gold, and oxides of tantalum, copper, silver, and aluminum, and halides of tantalum, copper, silver, and aluminum.

23. The method of producing x-ray illumination over a spatially extended area according to claim 20 wherein the illuminating is of the spatially-extended photocathode consisting essentially of the metal deposited on the surface of the semiconductor.

24. The method of producing x-ray illumination over a spatially extended area according to claim 20 wherein the illuminating is of the spatially-extended photocathode consisting essentially of the metal substantially homogeneously mixed in bulk with the semiconductor.

25. A method of producing x-ray illumination over a area of a workpiece semiconductor substrate, the method comprising:

illuminating with a laser light beam having a cross-sectional area that is substantially the same as an area of the workpiece semiconductor substrate an area, substantially the same size as is the laser light beam cross-sectional area, of a photocathode consisting essentially of a semiconductor in combination with a metal in order to produce electrons by the photoelectric effect over a photoelectron emission area substantially the same size as are both the laser light beam cross-sectional area and the workpiece semiconductor substrate;

generating a high voltage electric field in order to accelerate the produced electrons as a wavefront of electrons, the wavefront occupying an area substantially the same size as the photoelectron emission area from whence the electrons arose; and intercepting the wavefront of electrons with metal in order to produce x-ray radiation over an area of intercept that is substantially the same size as is the wavefront;

wherein the cross-sectional area of the laser light beam, the photoelectron emission area, the area of the wavefront of electrons, and the area of intercept are all substantially the same size, and are all substantially the same size as the workpiece semiconductor substrate.

26. An x-ray source for producing x-ray illumination over a area of a workpiece semiconductor substrate, the source comprising:

a laser beam generating means for producing a laser light beam having a cross-sectional area that is as large as the area of the workpiece semiconductor substrate;

a semiconductor;

a metal layer on the semiconductor, which metal layer emits electrons by the photoelectric effect in response to illumination by light, intercepting the laser light beam over a light intercept area as large as the laser light beam cross-sectional area, for producing electrons by the photoelectric effect over an electron production area as large as the light intercept area;

a high voltage means for generating an electric field for accelerating the produced electrons as an electron beam wavefront over an area as large as the electron production area;

a metal foil, positioned to intercept the electron beam wavefront, for producing x-rays over an electron intercept area as large as the electron beam wavefront in response thereto;

wherein because the x-rays are produced over the entire electron intercept area, because the electron intercept area is as large as the electron beam wavefront, because the area of the electron beam wavefront is as large as the area of light intercept, because the area of light intercept is as large as the laser light beam cross-sectional area, and because the laser light beam cross-sectional area is as large as the area of the workpiece semiconductor substrate, the x-rays are produced over an area that is also as large as the area of the workpiece semiconductor substrate.

27. An x-ray source for producing x-ray illumination over a area of a workpiece semiconductor substrate, the source comprising:

a laser beam generating means for producing a laser light beam;

a photoelectron emitter means, intercepting the laser light beam in order to produce by the photoelectric effect electrons over an electron production area that is as large as is the area of the workpiece semiconductor substrate;

a high voltage means for generating an electric field in order to accelerate the produced electrons as an electron beam wavefront having an area that is as large as is the area over which the electrons were produced, namely an area that is yet again as large as is the area of the workpiece semiconductor substrate;

a metal foil for intercepting the entire electron beam wavefront in order to produce x-rays over an area of electron intercept that is as large as is the area of the electron beam wavefront, namely an area that is still yet again as large as is the area of the workpiece semiconductor substrate.

28. A method of producing x-ray illumination over a area of a workpiece semiconductor substrate, the method comprising:

producing a laser light beam with a laser;

intercepting the laser light beam with a photoelectron emitter in order to produce by the photoelectric effect electrons over an electron production area that is as large as is the area of the workpiece semiconductor substrate;

generating with a high voltage source an electric field in order to accelerate the produced electrons as an electron beam wavefront having an area that is as large as is the area over which the electrons were produced, namely an area that is as large as is the area of the workpiece semiconductor substrate; and intercepting with a metal foil the entire electron beam wavefront in order to produce x-rays over an area of electron intercept that is as large as is the area of the electron beam wavefront, namely an area that is as large as is the area of the workpiece semiconductor substrate.

* * * * *